US009911137B2

(12) United States Patent
O'Donnell (10) Patent No.: US 9,911,137 B2
(45) Date of Patent: Mar. 6, 2018

(54) REACTIVE SIGNAGE (71) Applicant: Intersection Design and Technology, Inc., New York, NY (US)

(72) Inventor: Colin O'Donnell, Brooklyn, NY (US)

(73) Assignee: Intersection Design and Technology, Inc., New York, NY (US)

( * ) Notice: Subject to any disclaimer, the term of this patent is extended or adjusted under 35 U.S.C. 154(b) by 157 days.

(21) Appl. No.: 13/944,313

(22) Filed: Jul. 17, 2013

(65) Prior Publication Data
US 2014/0025499 A1 Jan. 23, 2014

Related U.S. Application Data (60) Provisional application No. 61/672,976, filed on Jul. 18, 2012.

(51) Int. Cl.
*G06Q 30/00* (2012.01)
*G06Q 30/02* (2012.01)

(52) U.S. Cl.
CPC ..... *G06Q 30/0261* (2013.01); *G06Q 30/0241* (2013.01); *G06Q 30/0251* (2013.01); *G06Q 30/0252* (2013.01); *G06Q 30/0265* (2013.01)

(58) Field of Classification Search
None
See application file for complete search history.

(56) References Cited

U.S. PATENT DOCUMENTS

| 6,108,954 A * | 8/2000 | Eiteneer ............... G09F 19/08 116/215 |
| 9,177,427 B1 * | 11/2015 | Briggs .................... G07C 5/00 |
| 2004/0044574 A1 * | 3/2004 | Cochran et al. ............... 705/14 |
| 2004/0192351 A1 * | 9/2004 | Duncan .................... 455/456.3 |
| 2008/0215415 A1 * | 9/2008 | Willms ............ G06Q 10/06316 705/14.43 |
| 2011/0270679 A1 * | 11/2011 | Tziortzis ............... G06Q 30/02 705/14.58 |
| 2012/0265616 A1 * | 10/2012 | Cao et al. .................. 705/14.58 |
| 2013/0124315 A1 * | 5/2013 | Doughty ............ G06Q 30/0269 705/14.53 |
| 2013/0283655 A1 * | 10/2013 | Saito ...................... B61L 3/125 40/370 |

* cited by examiner

*Primary Examiner* — Meredith A Long
(74) *Attorney, Agent, or Firm* — Wolf, Greenfield & Sacks, P.C.

(57) ABSTRACT

According to one aspect, embodiments of the invention provide a reactive display system comprising a display channel, data storage coupled to the display and configured to store pre-determined and reactive messages, a sensor configured to monitor at least one variable of an area within which the system is located, and a controller coupled to the sensor, data storage and the display, wherein the controller is configured to operate data storage and the display channel to display at least one pre-determined message in a first mode of operation, and wherein the controller is further configured to operate data storage and the display channel to display at least one reactive message in a second mode of operation in response to an indication from the sensor that the at least one variable has changed.

11 Claims, 4 Drawing Sheets

REACTIVE SIGNAGE

RELATED APPLICATION

This application claims priority under 35 U.S.C. § 119(e) to U.S. Provisional Application No. 61/672,976, entitled "REACTIVE SIGNAGE," filed Jul. 18, 2012, which is hereby incorporated by reference in its entirety for all purposes.

BACKGROUND OF INVENTION

Field of the Invention

At least one example in accordance with the present invention relates generally to marketing and advertisement displays.

Discussion of Related Art

Marketing and advertisement displays are often utilized to provide information to individuals as they pass by or view content on the display. Marketing and advertisement displays may include digital signage such as LCD, LED, plasma or projection based displays. Such displays are typically located in public and private environments, such as retail stores, hotels, restaurants, buildings, performance venues, transit stations, transit vehicles etc. and are configured to provide a desired message to potential patrons as they view the display.

SUMMARY

As described below, embodiments herein provide a reactive signage display system capable of sensing changes in the environment within which the display is located and altering the display in response to the sensed change in the environment. Such reactive signage may be more engaging, interesting, and/or informative to a potential customer or other viewer.

For example, the reactive signage display system may include a sensor (such as a temperature sensor, motion sensor, camera, etc.) that indicates when there is a change in the environment within which the display is located. In response to a change in the environment within which the display is located, indicated by the sensor, the message currently being displayed by the system may be altered. By altering the message (e.g., an advertisement, service or information based message) in response to the environmental change, the message may become more engaging, interesting, and/or informative to a viewer of the message.

Aspects in accord with the present invention are directed to a reactive display system; comprising a display channel, data storage coupled to the display channel and configured to store pre-determined and reactive messages, a sensor configured to monitor at least one variable of an area within which the system is located, and a controller coupled to the sensor, data storage and the display channel, wherein the controller is configured to operate data storage and the display channel to display at least one pre-determined message in a first mode of operation, and wherein the controller is further configured to operate data storage and the display channel to display at least one reactive message in a second mode of operation in response to an indication from the sensor that the at least one variable has changed. According to one embodiment, the display channel is a public display channel. In one embodiment, the reactive display system further comprises a housing, wherein the display channel, data storage, sensor, and controller are located within the housing.

According to one embodiment, the sensor is a temperature sensor, and wherein the at least one variable of the area includes a temperature of the area sensed by the temperature sensor.

According to another embodiment, the sensor is a camera. In one embodiment, the camera is one of a photographic camera, digital camera, and Infrared (IR) camera. In another embodiment, the at least one variable of the area includes a presence of an individual within the area sensed by the camera. In one embodiment, the at least one variable of the area includes a density of individuals within the area sensed by the camera. In another embodiment, the at least one variable of the area includes a proximity of an individual to the system sensed by the camera.

According to one embodiment, the sensor is one of an accelerometer and gyroscope, and wherein the at least one variable of the area includes a motion of the system sensed by the accelerometer or gyroscope.

According to another embodiment, the controller is further configured to operate data storage and the display channel to display a first reactive message in the second mode of operation in response to an indication from the sensor that the at least one variable has changed by a first magnitude and to display a second reactive message in the second mode of operation in response to an indication from the sensor that the at least one variable has changed by a second magnitude.

According to one embodiment, the data storage is further configured to store reactive messages including at least one of still images, videos, and animations. In another embodiment, the data storage is further configured to store reactive messages including advertisement messages or service information messages.

Another aspect in accord with the present invention is directed to a method for providing reactive signage; the method comprising retrieving, from data storage, at least one pre-determined message, providing, to a display channel, the at least one pre-determined message, displaying, with the display channel, the at least one pre-determined message, monitoring, with at least one sensor, an area adjacent the display channel for at least one change in the environment within which the display channel is located, and in response to identifying the at least one change in the environment within which the display channel is located; displaying, with the display channel, at least one reactive message based on the identified at least one change in the environment.

According to one embodiment, monitoring an area adjacent the display channel for at least one change in the environment includes monitoring the area adjacent the display channel for a change in temperature. In another embodiment, monitoring an area adjacent the display channel for at least one change in the environment includes monitoring the area adjacent the display channel for a change in a presence of an individual within the area. In one embodiment, monitoring an area adjacent the display channel for at least one change in the environment includes monitoring the area adjacent the display channel for a change in a density of individuals within the area. In another embodiment, monitoring an area adjacent the display channel for at least one change in the environment includes monitoring the area adjacent the display channel for a change in motion of the display channel.

According to another embodiment, displaying at least one reactive message based on the identified at least one change in the environment includes displaying a first reactive message in response to identifying a first change in the environment within which the display channel is located and displaying a second reactive message in response to identifying a second change in the environment within which the display channel is located.

One aspect in accord with the present invention is directed to a display system comprising a display channel, data storage coupled to the display, a controller coupled to the data storage and the display, and means for identifying a change in the environment within which the display system is located and for providing a reactive message to the display channel in response to identifying the change in the environment within which the display system is located.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As described above, marketing and advertisement displays are often utilized to provide information to individuals as they pass by or view content on the display. However, common marketing and advertising displays are static (e.g., posters, signs, etc) and/or are not tailored to the specific environment within which the advertising displays are located. This limits the value of such displays as a potential customer is less likely to take notice of an unchanging (e.g., a static poster or sign) or merely repetitive (e.g. a repeating video) display.

Accordingly, embodiments described herein provide a reactive signage display system capable of sensing changes in the environment within which the display is located and altering the display in response to the sensed change in the environment. Such reactive signage may be more engaging, interesting, and/or informative to a potential customer or other viewer.

Figure 1:
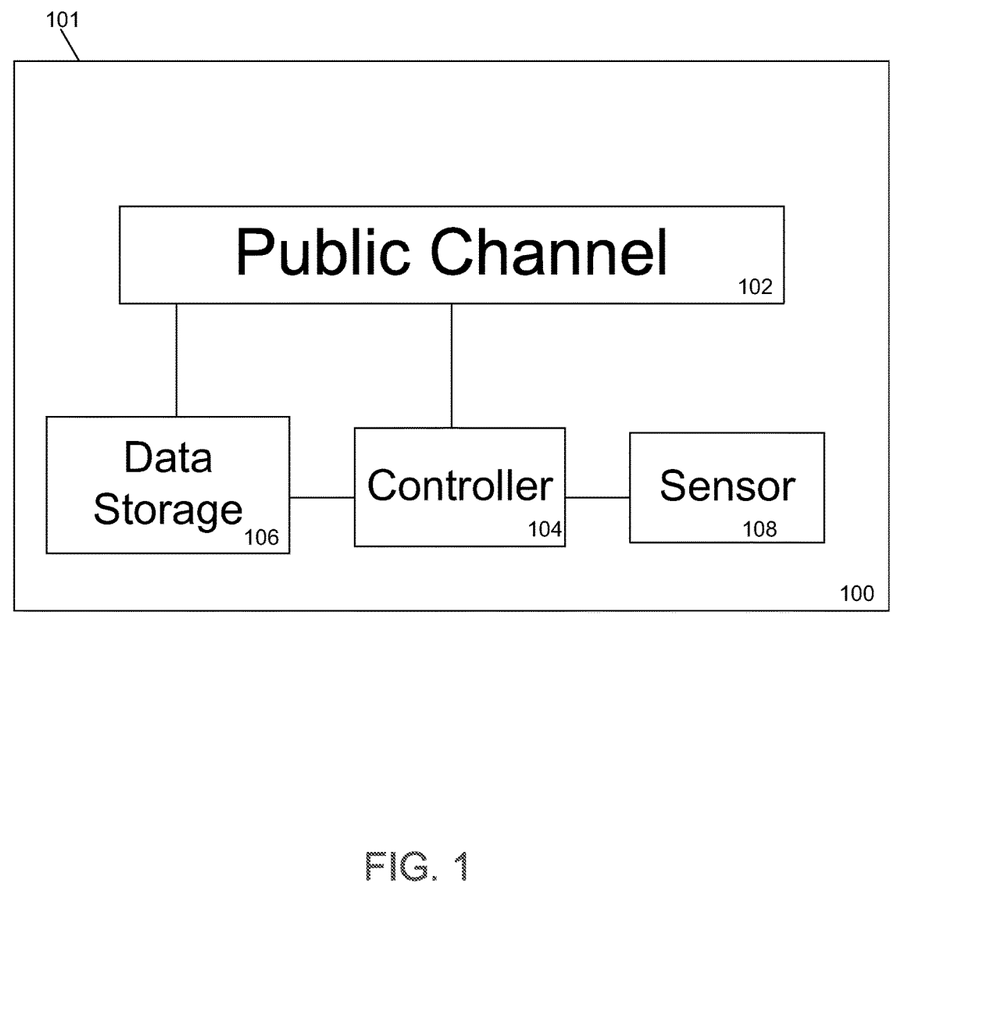
FIG. 1 is a block diagram of a display system in accordance with aspects of the present invention.

FIG. 1 illustrates a block diagram of one embodiment of a display system 100 in accordance with aspects of the present invention. The display system 100 includes a public channel 102. According to one embodiment, the public channel 102 is a device, typically located in a public setting, which is capable of broadcasting information to local users in its vicinity. For example, in some embodiments, the public channel 102 is a video display, video screen, or electronic sign in a retail store, a light, sound, or video display in a public transit station or vehicle, a speaker in a waiting room, or any other device capable of disseminating information publicly to individuals in its presence.

The display system 100 also includes a controller 104 coupled to the public channel 102, data storage 106 coupled to the controller 104 and the public channel 102, and a sensor 108 coupled to the controller 104. According to one embodiment, the controller 104 is coupled to an external network. In one embodiment, the controller 104 is hardwired to an external network. In another embodiment, the controller 104 communicates wirelessly with an external network. According to one embodiment, the public channel 102, data storage 106, controller 104 and sensor 108 are located within a housing 101; however, in other embodiments, the components of the system 100 may be located in separate housings.

According to one embodiment, the public channel 102 is configured to display content (e.g., advertising messages) received from data storage 106. According to another embodiment, the public channel 102 is configured to display content received from a remote location or source via an external network coupled to the controller 104. For example, the content displayed on the public channel 102 may be retrieved from an off-site server, cloud storage, or from another type of source via an Application Programming Interface (API). According to one embodiment, the content displayed by the public channel includes still images, video or a combination of both. In another embodiment, the content displayed by the public channel includes illustrations or photographic imagery. In other embodiments, the content displayed by the public channel may be of any form and substance appropriate to be displayed on the public channel 102.

According to one embodiment, the controller 104 controls the content which is provided from data storage 106 (or an external source) to the public channel 102. In one embodiment, the controller 104 operates data storage 106 (or an external source) to provide pre-determined content to the public channel 102. In one embodiment, the pre-determined content includes a single message to the public channel 102. In another embodiment the pre-determined content includes a series of messages to the public channel 102, the series of messages to be displayed by the public channel 102 in sequence. According to another embodiment, the controller 104 controls the content which is provided from an external network to the public channel 102.

According to one embodiment, the sensor 108 monitors a variable of the environment within which the system 100 is located and notifies the controller 104 of a change in the variable (i.e., a change in the surrounding environment). In one embodiment the sensor 108 is a motion sensor which notifies the controller 104 that the motion of the system 100 has changed. For example, according to one embodiment, the sensor 108 is an accelerometer or gyroscope; however, in other embodiments, any other type of motion sensor may be used.

According to another embodiment, the sensor 108 is a camera which notifies the controller of a change in the area in front of the system 100. For example, in one embodiment, the sensor 108 is a photographic camera, digital camera or Infrared (IR) camera; however, in other embodiment, any other type of camera may be used. In one embodiment, a camera may monitor the presence, proximity or density of people in the immediate vicinity of the system 100.

According to another embodiment, the sensor 108 is a temperature sensor configured to notify the controller 104 of a change in temperature of the environment within which the system 100 is located.

According to one embodiment, the system 100 includes a single sensor 108; however, in other embodiments the system 100 includes more than one sensor 108 to monitor more than one variable of the system's surrounding environment.

While the public channel 102 is displaying pre-determined content and in response to receiving a notification from the sensor 108 that at least one variable of the system's 100 surrounding environment has changed, the controller 104 operates the public channel 102 to display a reactive message based on the sensed changed variable. According to one embodiment, the reactive message is pre-programmed into the public channel 102. In another embodiment, the controller 104 operates data storage 106 (or an external source) to provide the reactive message to the public channel 102 in response to receiving a notification from the sensor 108 that a variable has changed. According to one embodiment, the reactive message may include a completely new message to be displayed on the public channel 102. In another embodiment, the reactive message may alter a message already being displayed by the public channel 102.

According to one embodiment, the controller 104 operates data storage 106 (or an external source) to provide a specific reactive message to the public channel 102 in response to the type of variable change (e.g. motion, temperature, proximity etc.) that is indicated by the sensor 108. For example, in one embodiment, the controller 104 operates data storage 106 (or an external source) to provide a first reactive message to the public channel 102 in response to a sensor 108 indicating that the speed at which the system 100 is moving has changed, a second reactive message to the public channel 102 in response to a sensor 108 indicating that the temperature of the system 100 has risen, and/or a third reactive message to the public channel 102 in response to a sensor 108 indicating that a large number of people have stepped in front of the system 100.

In another embodiment, the controller operates data storage 106 (or an external source) to provide a specific reactive message to the public channel 102 in response to the magnitude of variable change sensed by the sensor 108. For example, in one embodiment, the controller 104 operates data storage 106 (or an external source) to provide a specific reactive message to the public channel 102 in response to the temperature sensed by a sensor 108 exceeding a threshold level. In another embodiment, the controller 104 operates data storage 106 (or an external source) to provide a specific reactive message to the public channel 102 in response to a sensor 108 sensing an abrupt change in motion (e.g., sudden stop or acceleration). In another embodiment, the controller 104 operates data storage 106 (or an external source) to provide a specific reactive message to the public channel 102 in response the density of people standing in front of the system 100 exceeding a threshold level.

Figure 2:
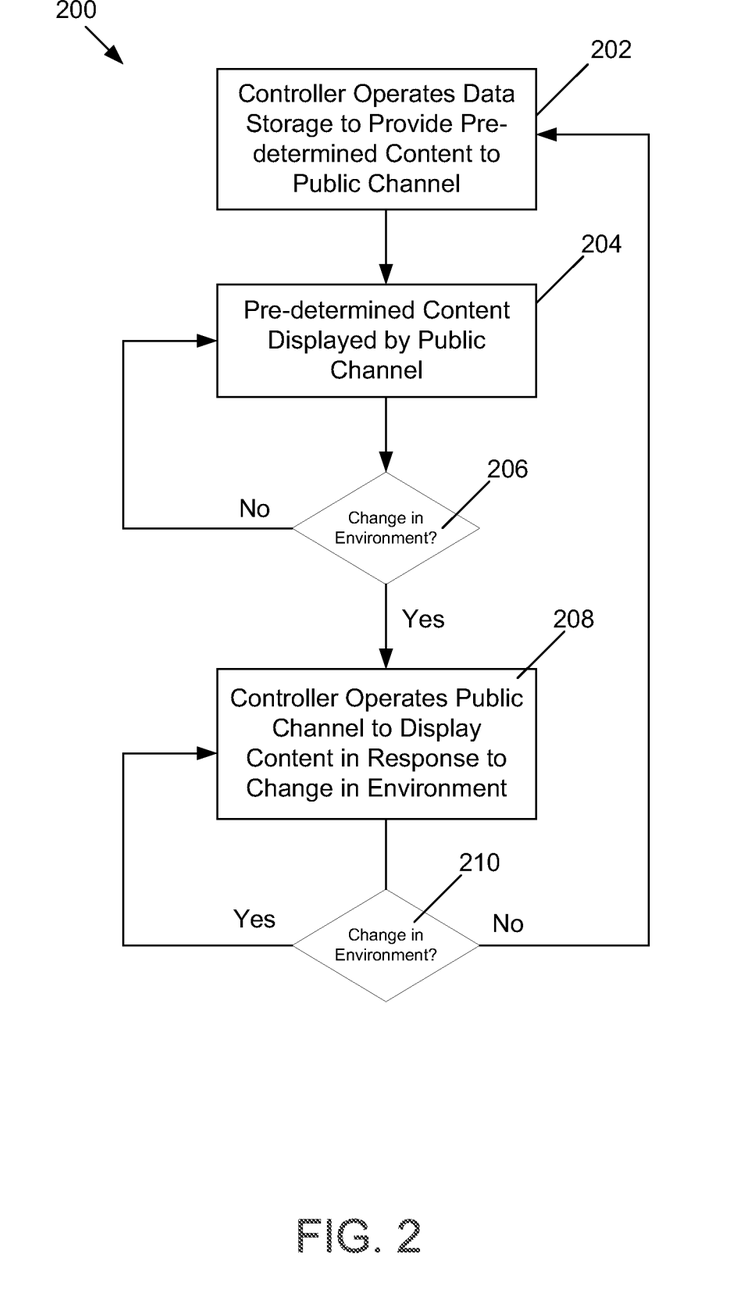
FIG. 2 is a flow chart of a process for providing reactive signage in accordance with one embodiment of the present invention.

FIG. 2 illustrates a flow chart 200 of a process for providing reactive signage in accordance with one embodiment of the present invention.

At block 202, the controller 104 operates data storage 106 (or an external source) to provide pre-determined content to the public channel 102. As described above, the controller 104 may operate data storage 106 (or an external source) to provide a single message to the public channel 102 or may operate data storage 106 (or an external source) to provide a series of messages to the public channel 102. At block 204, the pre-determined content received by the public channel 102 is displayed by the public channel 102.

At block 206, a determination is made whether the sensor 108 indicates a change in a monitored variable (i.e., a change in the environment within which the system 100 is located). For example, as described above, the sensor 108 may notify the controller 104 of a change in temperature, a change in motion, a change in crowd proximity, a change in crowd density, a change in the presence of a person, etc. In response to a determination that the sensor 108 has not indicated a change in the environment, at block 204, the public channel 102 continues to display the pre-determined content.

At block 208, in response to a determination that the sensor 108 has indicated a change in the environment (i.e., a change in a monitored variable), the controller 104 operates the public channel 102 to display a reactive message in response to the change in environment. As described above, the public channel 102 may be pre-programmed to provide the reactive message or the controller 104 may operate data storage 106 (or an external source) to provide the reactive message to the public channel 102. As also described above, the reactive message may comprise of entirely new content or it may merely alter content currently being displayed by the public channel 102.

At block 210, a determination is made whether the sensor 108 continues to indicate a change in the environment surrounding the system 100. In response to a determination that the sensor 108 still indicates a change in a monitored variable, at block 208 the public channel 102 continues to display the reactive message. In response to a determination that the sensor 108 no longer indicates a change in a monitored variable (i.e., a change in the environment), at block 202, the controller 104 again operates data storage 106 (or an external source) and the public channel 102 to return to displaying the pre-determined content.

According to one embodiment of the display system 100, the display system 100 is fixably attached to an interior portion of a vehicle (e.g. to the interior wall of a transit vehicle such as a subway car, bus, or rail car). The display system 100 is configured to provide content (e.g., advertising messages) to individuals in its vicinity within the vehicle. The messages are displayed on the public channel 102.

As described above, the controller 104 operates data storage 106 (or an external source) and the public channel 102 to display pre-determined content on the public channel 102. In response to a change in the environment of the vehicle (e.g. the vehicle changes motion, the temperature within the vehicle increases, the number of people within the vehicle changes, etc.) indicated by the sensor 108, the controller 104 operates the public channel 102 (and potentially data storage 106 or an external source) to display a reactive message.

According to one embodiment, the pre-determined content displayed by the public channel 102 is an advertisement and the reactive message provided in response to an indication of changed environment animates a portion of the advertisement. For example, in one embodiment, the pre-determined content is an advertisement including a digital image of a beverage container (e.g., a beer glass, beer bottle, soda bottle, etc.). In response to a sudden stop or acceleration by the vehicle, the reactive message displayed by the public channel 102 may be an animation displaying the liquid within the beverage container reacting to the sudden stop or acceleration of the vehicle (e.g. by sloshing around the container). According to one embodiment, the controller 104 utilizes a physics simulation engine to simulate the behavior of the liquid within the beverage container specifically in response to the magnitude of the change in motion of the vehicle.

In another embodiment, the pre-determined content displayed by the public channel 102 is an advertisement and the reactive message provided in response to an indication of changed environment alters the theme of the advertisement. In one embodiment, the theme of an advertisement may be altered in response to an indication from the sensor 108 that the temperature within the vehicle has exceeded a threshold. For example, in response to notification that the temperature within the vehicle has exceeded a certain level, an advertisement for a cold beverage may be altered to display imagery (e.g., sweltering sun, heat waves, sweating bottle, etc.) which is more conducive to entice an individual to purchase a beverage in the hot weather. Alternatively, in response to a notification that the temperature within the vehicle has fallen below a certain level, an advertisement for a beverage may be altered to display imagery (e.g., a steaming beverage, a warm fire, etc.) which is more conducive to entice in individual to purchase a beverage in the cold weather.

According to another embodiment, the pre-determined content displayed by the public channel 102 is service information and the reactive message provided in response to an indication of changed environment includes an information message that specifically addresses the changed environment. For example, in one embodiment, the pre-determined content is service information displayed near a door of the vehicle that provides instructions to users entering or exiting the vehicle. In response to an indication from the sensor 108 that the density of people in front of the display 100 has increased above a threshold, the service information (e.g., as displayed by the public channel 102) may instruct individuals entering the train to move farther into the train if possible.

According to another embodiment, the public channel 102 may be turned on or off depending on whether the sensor 108 identifies the presence of individuals near the system 100. For example, if after a period of time, the sensor 108 notifies the controller 104 that it does not sense the presence of any individuals near the system 100, then the public channel 102 may be turned off. Alternatively, if the public channel 102 is currently turned off, the sensor 108 may notify the controller 104 that it senses the presence of an individual and in response, the public channel 102 may be turned on.

As described herein, the system 100 is located in a vehicle; however, in other embodiments, the system may be located anywhere where signage capable of reacting to changes in the environment is appropriate.

As described herein, the public channel 102 is a public display; however, in other embodiments, the system 100 may utilize a non-public display, such as a computer or mobile phone screen to display the pre-determined and reactive messages in response to environmental changes identified by the sensor 108.

As described herein, the pre-determined and reactive content may be retrieved from data storage 106 by the controller 104; however, in other embodiments the controller 104 may retrieve pre-determined and/or reactive content from an external source.

In other embodiments, content retrieved and displayed by the public channel 102 may depend on other parameters, either alone or in combination with, the sensor 108 output. For instance, if it is determined that particular users identified within a certain proximity to the public channel 102 are present (e.g., by detecting mobile devices of particular users) then content retrieved based on a change in the environment may be adjusted to suit the particular users (e.g., based on user profiles or other collected information from the particular users).

Various embodiments according to the present invention may be implemented on one or more computer systems or other devices. A computer system may be a single computer that may include a minicomputer, a mainframe, a server, a personal computer, or combination thereof. The computer system may include any type of system capable of performing remote computing operations (e.g., cell phone, PDA, tablet, smart-phone, set-top box, or other system). A computer system used to run the operation may also include any combination of computer system types that cooperate to accomplish system-level tasks. Multiple computer systems may also be used to run the operation. The computer system also may include input or output devices, displays, or data storage units. It should be appreciated that any computer system or systems may be used, and the invention is not limited to any number, type, or configuration of computer systems.

These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate operation of the described system according to various embodiments of the invention. Further, the system may be located on a single computer or may be distributed among a plurality of computers attached by a communications network.

Figure 3:
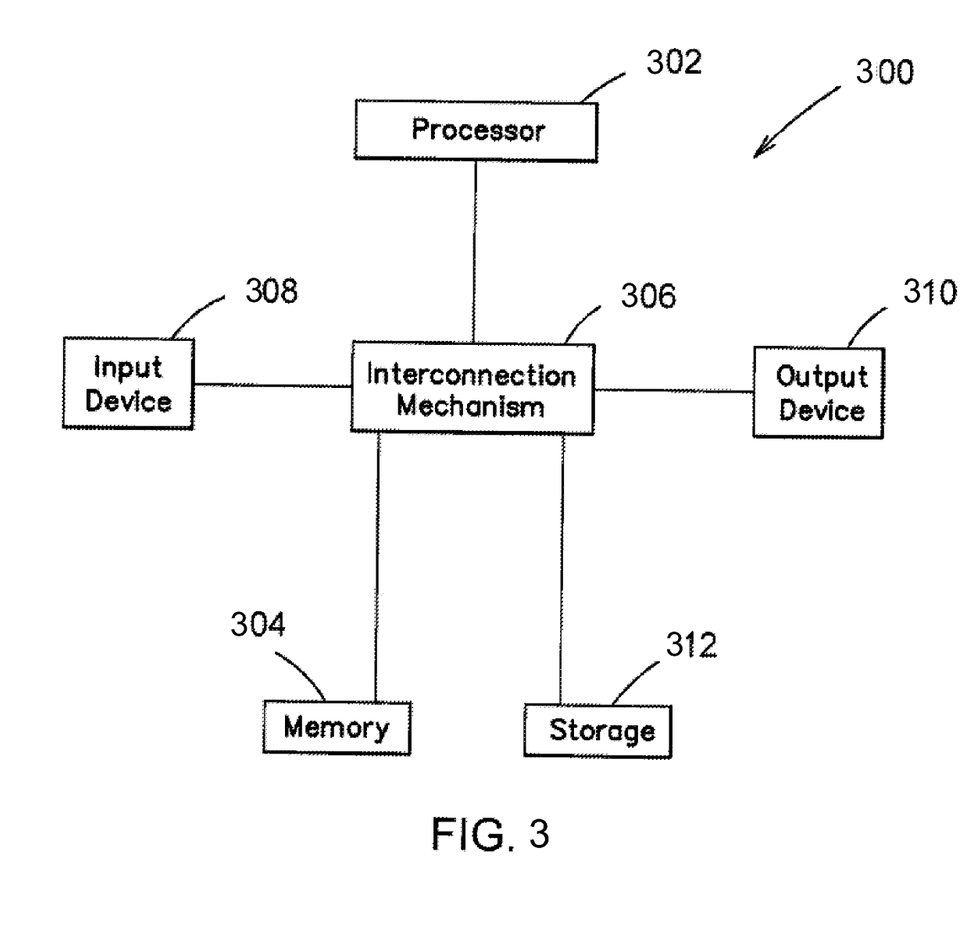
FIG. 3 is a block diagram of a general-purpose computer system upon which various embodiments of the invention may be implemented.

For example, various aspects of the invention may be implemented as specialized software executing in a general-purpose computer system 300 such as that shown in FIG. 3. The computer system 300 may include a processor 302 connected to one or more memory devices (i.e., data storage) 304, such as a disk drive, memory, or other device for storing data. Memory 304 is typically used for storing programs and data during operation of the computer system 300. Components of computer system 300 may be coupled by an interconnection mechanism 306, which may include one or more busses (e.g., between components that are integrated within a same machine) and/or a network (e.g., between components that reside on separate discrete machines). The interconnection mechanism 306 enables communications (e.g., data, instructions) to be exchanged between system components of system 300. Computer system 300 also includes one or more input devices 308, for example, a keyboard, mouse, trackball, microphone, touch screen, and one or more output devices 310, for example, a printing device, display screen, and/or speaker. In addition, computer system 300 may contain one or more interfaces (not shown) that connect computer system 300 to a communication network (in addition or as an alternative to the interconnection mechanism 306).

Figure 4:
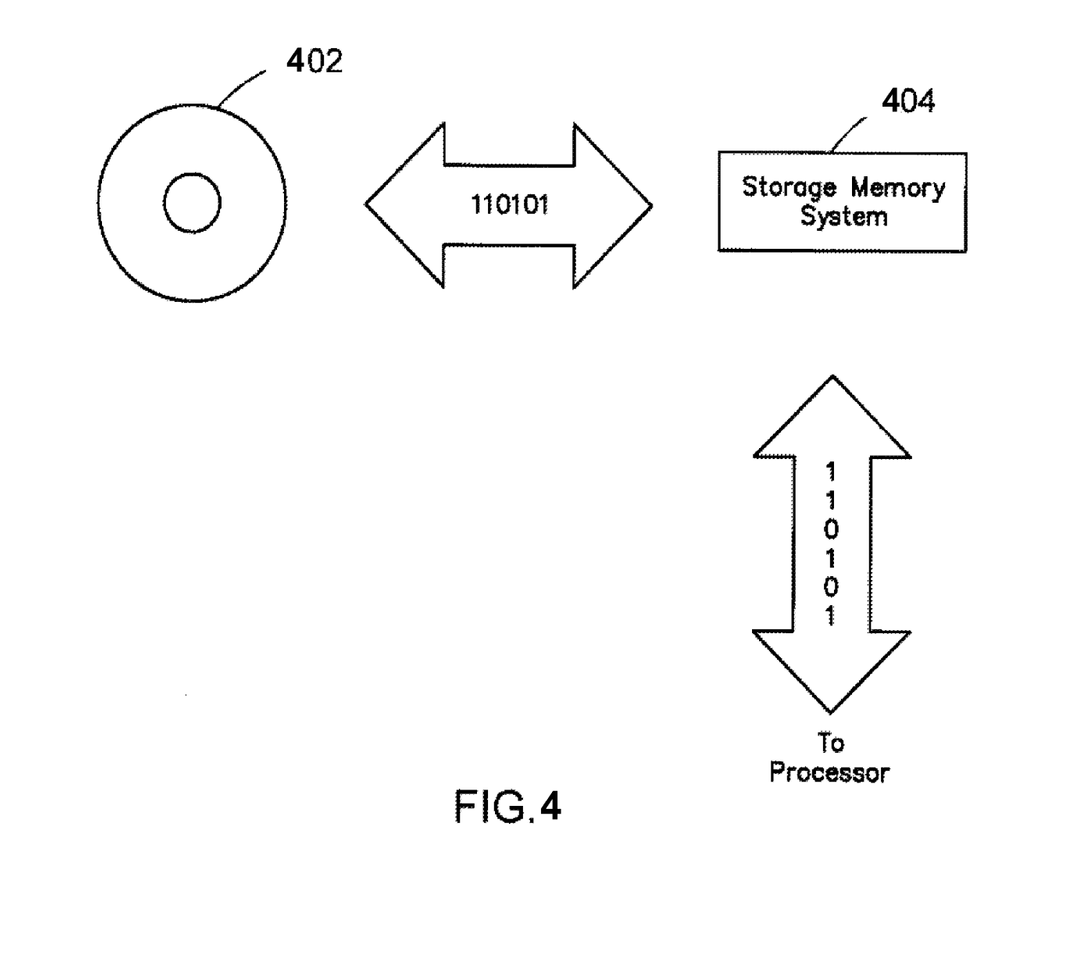
FIG. 4 is a block diagram of a computer data storage system with which various embodiments of the invention may be practiced.

The storage system 312, shown in greater detail in FIG. 4, typically includes a computer readable and writeable non-volatile recording medium 402 in which signals are stored that define a program to be executed by the processor or information stored on or in the medium 402 to be processed by the program. The medium may, for example, be a disk or flash memory. Typically, in operation, the processor causes data to be read from the nonvolatile recording medium 402 into another memory 404 that allows for faster access to the information by the processor than does the medium 402.

This memory 404 is typically a volatile, random access memory such as a dynamic random access memory (DRAM) or static memory (SRAM). It may be located in storage system 312, as shown, or in memory system 304. The processor 302 generally manipulates the data within the integrated circuit memory 304, 404 and then copies the data to the medium 402 after processing is completed. A variety of mechanisms are known for managing data movement between the medium 402 and the integrated circuit memory element 304, 404, and the invention is not limited thereto. The invention is not limited to a particular memory system 304 or storage system 312.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 300 is shown by way of example as one type of computer system upon which various aspects of the invention may be practiced, it should be appreciated that aspects of the invention are not limited to being implemented on the computer system as shown in FIG. 3. Various aspects of the invention may be practiced on one or more computers having a different architecture or components that that shown in FIG. 3.

Computer system 300 may be a general-purpose computer system that is programmable using a high-level computer programming language. Computer system 300 may be also implemented using specially programmed, special purpose hardware. In computer system 300, processor 302 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, or Windows Visa operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Embodiments described herein provide a reactive signage display system capable of sensing changes in the environment within which the display is located and altering the display in response to the sensed change in the environment.

What is claimed is:
1. A reactive display system, comprising:
a display channel including an electronic advertisement display element fixedly attached to an interior portion of a vehicle;
data storage coupled to the display channel and configured to store pre-determined and reactive messages;
at least two sensors configured to monitor at least two variables of an area within which the system is located, wherein the at least two sensors include a temperature sensor and a motion sensor, the motion sensor comprising at least one of an accelerometer and a gyroscope, and wherein the at least two variables of the area include a temperature of the area sensed by the temperature sensor and a motion of the system sensed by the motion sensor;
a controller coupled to the at least two sensors, data storage and the electronic advertisement display element, the controller including a physics simulation engine;
wherein the physics simulation engine is adapted to simulate a behavior of an advertisement message based on a detected change in motion in the reactive display system;
wherein the controller is configured to operate data storage and the electronic advertisement display element to display at least one pre-determined message in a first mode of operation;
wherein the controller is further configured to operate data storage and the electronic advertisement display element to display, by the electronic advertisement display element, at least one reactive message in a second mode of operation in response to an indication from one of the at least two sensors that one of the monitored at least two variables has changed; and
wherein in displaying the at least one reactive message in the second mode of operation in response to the indication from one of the at least two sensors that one of the at least two variables has changed, the controller is further configured to operate data storage and the display channel to display:
- a first reactive message in response to an indication from the motion sensor that the motion of the system has changed and to utilize the physics simulation engine to generate the first reactive message based on a magnitude of the change in motion of the reactive display system; and
- a second reactive message in response to an indication from the temperature sensor that the temperature of the area has changed and to generate the second reactive message based on the temperature of the area.

2. The reactive display system of claim 1, wherein the display channel is a public display channel.

3. The reactive display system of claim 1, wherein the at least two sensors includes a camera.

4. The reactive display system of claim 3, wherein the camera is one of a photographic camera, digital camera, and Infrared (IR) camera.

5. The reactive display system of claim 3, wherein the at least two variables of the area includes a presence of an individual within the area sensed by the camera.

6. The reactive display system of claim 3, wherein the at least two variables of the area includes a density of individuals within the area sensed by the camera.

7. The reactive display system of claim 3, wherein the at least two variables of the area includes a proximity of an individual to the system sensed by the camera.

8. The reactive display system of claim 1, wherein the controller is further configured to operate data storage and the display channel to display a third reactive message in the second mode of operation in response to an indication from one of the at least two sensors that one of the at least two variables has changed by a first magnitude and to display a fourth reactive message in the second mode of operation in response to an indication from one of the at least two sensors that one of the at least two variables has changed by a second magnitude.

9. The reactive display system of claim 1, wherein the data storage is further configured to store the at least one reactive message, the at least one reactive message including at least one of still images, videos, and animations.

10. The reactive display system of claim 1, wherein the data storage is further configured to store the at least one reactive message, the at least one reactive message including advertisement messages or service information messages.

11. The reactive display system of claim 1, further comprising a housing, wherein the display channel, data storage, at least two sensors, and controller are located within the housing.

* * * * *

UNITED STATES PATENT AND TRADEMARK OFFICE
CERTIFICATE OF CORRECTION

PATENT NO.       : 9,911,137 B2
APPLICATION NO.  : 13/944313
DATED            : March 6, 2018
INVENTOR(S)      : Colin O'Donnell It is certified that error appears in the above-identified patent and that said Letters Patent is hereby corrected as shown below:

In the Claims

At Columns 10-11, Claim 1, please delete Claim 1 and replace with the Claim 1 shown below:
--A reactive display system, comprising:
    a display channel including an electronic advertisement display element fixedly attached to an interior portion of a vehicle;
    data storage coupled to the display channel and configured to store pre-determined and reactive messages;
    at least two sensors configured to monitor, in real time, at least two variables of an area within which the system is located, wherein the at least two sensors include a temperature sensor and a motion sensor, the motion sensor comprising at least one of an accelerometer and a gyroscope, and wherein the at least two variables of the area include a temperature of the area sensed by the temperature sensor and a motion of the system sensed by the motion sensor;
    a controller coupled to the at least two sensors, data storage and the electronic advertisement display element, the controller including:
    a physics simulation engine configured to dynamically animate behavior of an advertisement message based on at least one of a real time magnitude of change in motion of the reactive display system measured by the motion sensor or a real time temperature of the area measured by the temperature sensor; and
    wherein the controller is configured to operate data storage and the electronic display element to:
    display at least one pre-determined message in a first mode of operation; and
    display, by the electronic advertisement display element, at least one reactive message in a second mode of operation in response to an indication from one of the at least two sensors that one of the monitored at least two variables has changed wherein displaying the at least one reactive message in the second mode of operation comprises:
    detecting a change of motion of the reactive display system based on an output of the motion sensor;
    displaying, responsive to detecting the change in motion, a first reactive message, the displaying of the first reactive message comprising operating the physics simulation engine to generate Signed and Sealed this
Seventh Day of August, 2018

Andrei Iancu
*Director of the United States Patent and Trademark Office* a first dynamic animation in the first reactive message based on the real time magnitude of the change in motion of the reactive display system;
  detecting that the temperature value measured by the temperature sensor has exceeded a threshold; and
  displaying, responsive to detecting that the temperature has exceeded the threshold, a second reactive message, the displaying of the second reactive message comprising operating the physics simulation engine to generate a second dynamic animation in the second reactive message based on the real time temperature.--.

At Column 11, Claim 3, Line 18, please delete the word "includes" and replace with --include--.

At Column 11, Claim 5, Line 23, please delete the word "includes" and replace with --include--.

At Column 11, Claim 6, Line 26, please delete the word "includes" and replace with --include--.

At Column 12, Claim 7, Line 2, please delete the word "includes" and replace with --include--.